United States Patent [19]

Mantovani et al.

[11] Patent Number: 4,648,124
[45] Date of Patent: Mar. 3, 1987

[54] APPARATUS FOR LOCATING PASSIVE INTERMODULATION INTERFERENCE SOURCES

[75] Inventors: John C. Mantovani, Lilburn; Hugh W. Denny, Decatur; Walter B. Warren, Marietta, all of Ga.

[73] Assignee: The United States of America as represented by the Secretary of the Air Force, Washington, D.C.

[21] Appl. No.: 719,792

[22] Filed: Apr. 4, 1985

[51] Int. Cl.⁴ .............................................. H04B 17/00
[52] U.S. Cl. ..................................... 455/67; 455/295; 324/57 N
[58] Field of Search ....................... 455/19, 20, 63, 67, 455/295, 296; 367/13; 343/17.7; 324/57 N

[56] References Cited

U.S. PATENT DOCUMENTS

| | | | |
|---|---|---|---|
| 2,193,102 | 3/1940 | Koch | 455/19 |
| 3,825,931 | 7/1974 | Gonzalez et al. | 343/100 AP |
| 4,027,289 | 5/1977 | Toman | 340/172.5 |
| 4,119,964 | 10/1978 | Johannsen et al. | 455/67 |
| 4,195,262 | 3/1980 | King | 455/67 |
| 4,264,978 | 4/1981 | Whidden | 455/67 |
| 4,399,556 | 8/1983 | Whidden | 455/67 |

Primary Examiner—Jin F. Ng
Attorney, Agent, or Firm—William Stepanishen; Donald J. Singer

[57] ABSTRACT

An apparatus for locating passive interference sources by using a pair of different RF signals in conjunction with an acoustic signal to generate intermodulation products in metal-to-metal junctions. The acoustic tagging technique utilizes a focused, high power beam of acoustic energy to mechanically vibrate the suspected offending junction. This mechanical vibration causes the level of intermodulation products that are generated in the junction to become amplitude modulated at the frequency of the acoustic illumination. The detection of the AM sidebands with a low noise RF receiver that is tuned to a particular intermodulated component, permits the offending junction to be located.

6 Claims, 7 Drawing Figures (a) CONDUCTED RECEIVING PATH (b) RADIATED RECEIVING PATH

APPARATUS FOR LOCATING PASSIVE INTERMODULATION INTERFERENCE SOURCES

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an interference test apparatus, and in particular an apparatus for locating intermodulation interference sources.

The density of electromagnetic emitters and receptors which are located in the modern military environment has increased rapidly with the development of such large scale military systems as communications, radar, and electronic counter measures. As an example of an environment which would be subjected to such an interference condition, consider the E-4 aircraft. This aircraft utilizes approximately forty-four different systems which are readily identifiable and each of which are potential sources of problems. The transmitter output power levels range from 10 W (+40 dBm) to 1000 W (+60 dBm). The receivers exhibit sensitivity levels from −100 dBm to −135 dBm. Thus, the potential transmitter-to-receiver isolation which would be necessary to avoid interference, ranges from 140 dB to 195 dB.

The interference which is caused by intermodulation (IM) and harmonic products that are generated in nonlinear active devices such as transistors, diodes, and other devices containing semiconductor PN junctions, has been comprehensively researched and examined. However, recent evidence indicates that in operational situations where multiple high power RF signals coexist with sensitive receivers even some passive devices may exhibit sufficiently nonlinear behavior to produce this type of interference. An example of such passive devices in which intermodulation interference is generated are the metal-insulation-metal junctions that occur in the packaging of large scale systems.

The generation of intermodulation products in passive devices arises because most metals in air intrinsically possess a thin layer of oxidation which can and does act as an insulation. When two metallic bodies are joined, a metal-insulator-metal (MIM) interface is produced. Before contact the insulating materials act as a dielectric. Under light pressure the oxidation layer functions as a semiconductor junction. Under increased pressure of contact, the layer is penetrated and the properties of the junction change rapidly. Two programs were conducted at Georgia Tech to characterize the intermodulation generation properties of metal-to-metal interfaces that were found in coaxial cables and connectors, as well as, metal-to-metal interfaces which are similar in characteristics to those found in an aircraft fuselage panel bonds. In particular, it has been found that coaxial connectors were shown to be possible sources of interference products whose levels can be as high as −100 dB relative to the applied signals in the HF to UHF frequency region. Similar tests which were performed on various overlapping metal panels, produced intermodulation product levels that ranged as high as −75 dB relative to the applied signals. Thus, in operational situations which require a transmitter-to-receiver isolation as high as 195 dB, the passive source producing interference components of the above noted magnitudes pose a serious threat to system performance.

If every cable and connector and every metal-to-metal interface is assumed to be a potential nonlinear interference source, the total number of possible interference generators in any practical situation is very large. As the number of transmitter and receivers, and their respective power levels and sensitivities increase, the system interference problems which are associated with these passive sources, becomes increasingly severe. Obviously, every one of the possible generators does not contribute equally. A bad metal-to-metal interface in a low RF current region is not likely to be a serious source of interference nor are high RF currents themselves, detrimental, unless bad joints in the currents path also exist. The present invention provides an apparatus for identifying, locating, and measuring the various interference sources that are generation as a result of metal-to-metal junctions which are exposed to multiple high amplitude R.F. signals.

SUMMARY OF THE INVENTION

The present invention utilizes a pair of RF sources operating at different frequencies to generate intermodulation products in a metal-to-metal junction that is subjected to an acoustic wave to mechanically vibrate the junction at a constant frequency. A specific junction that is mechanically vibrated, will produce AM sidebands that identifies a particular offending junction in an environment of many junctions.

It is one object of the present invention, therefore, to provide an improved intermodulation interference locator apparatus.

It is another object of the invention to provide an improved intermodulation interference locator apparatus wherein passive interference sources in metal-to-metal junctions can be identified.

It is another object of the invention to provide an improved intermodulation interference locator apparatus wherein a focused, high power beam of acoustic energy is utilized to mechanically vibrate a metal-to-metal junction.

It is another object of the invention to provide an improved intermodulation interference locator apparatus wherein the mechanical vibration of an offending junction will generate an amplitude modulated signal.

It is another object of the invention to provide an improved intermodulation interference locator apparatus wherein the detection of the amplitude modulation sidebands permits the location of an offending junction in an environment of many metal-to-metal junctions.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
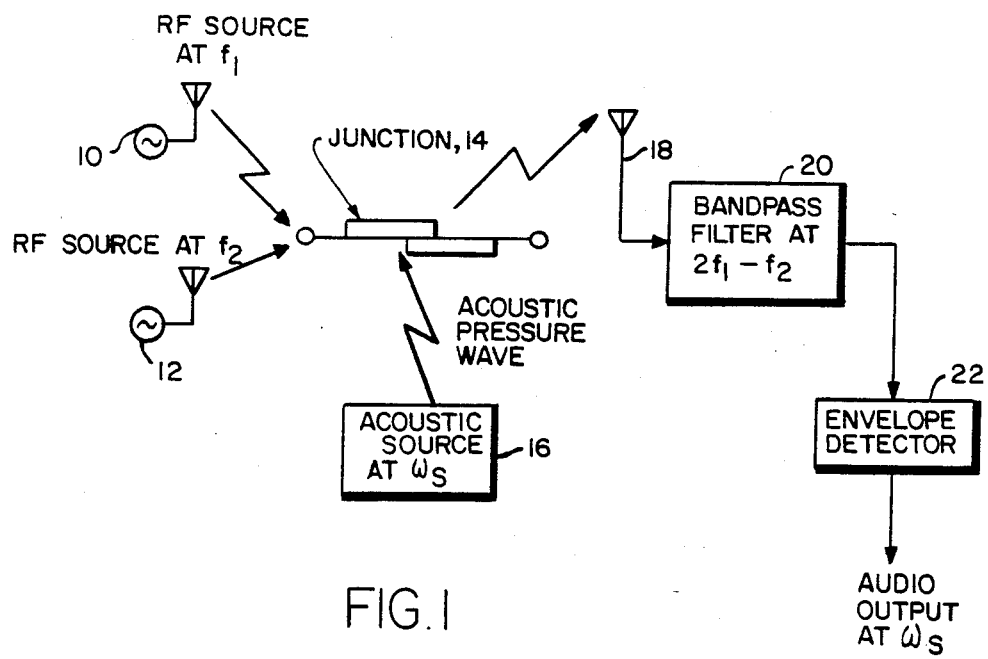
FIG. 1 is a block diagram of an intermodulation interference locator apparatus according to the present invention.

Referring now to FIG. 1, there is shown a block diagram of the intermodulation interference locator apparatus utilizing a first RF source 10 operating at frequency $f_1$ and a second RF source 12 operating at frequency $f_2$ to radiate a pair of RF signals to the junction 14. An acoustic source 16 which is operating at a frequency, $\omega_s$ also applies an acoustic signal to the metal-to-metal junction 14. The acoustic pressure wave from the acoustic source 16 causes the metal-to-metal junction 14 to mechanically vibrate. The mechanical vibration of the junction 14 in the presence of RF signals $f_1$, $f_2$ causes an intermodulation signal which is amplitude modulated to be radiated to the antenna 18. The amplitude modulated signal is filtered in bandpass filter unit 20 and applied to an envelope detector unit 22. The output of the envelope detector unit 22 is an audio signal.

The operation of the intermodulation interference locator apparatus will be more fully understood with respect to the following detailed description of the apparatus operation. It should be noted that the mechanical motion or vibration in metal-to-metal junctions produced sidebands on intermodulation products. Therefore, when a metal-to-metal junction was mechanically vibrated at a constant frequency, the intermodulation product which was then produced in the junction, would become amplitude modulated at the frequency of the mechanical vibration. Thus, if an RF receiver is used to monitor an intermodulation signal which becomes amplitude modulated when a particular junction is mechanically vibrated, then the detection of the associated amplitude (AM) sidebands is an indication that the junction is indeed a source of nonlinear interference. The advantage of mechanical vibration, or tagging, is that it can be applied selectively, i.e., only that junction which is being mechanically vibrated will produce AM sidebands at the tagging frequency. It thus uniquely identifies a particular offending junction in the presence of many possible interference sources.

Where the suspected junction is accessible, mechanical vibration through the direct contact of an appropriately configured electromagnet is the simplest approach. However, for large structures where the offending junctions are not easily reached, remote application of the mechanical stimulation is needed. For this situation, high level radiated acoustic waves which vary the mechanical pressure that is applied to the metal-to-metal junction are utilized. This manner of operation is illustrated in FIG. 1. The potential interference generator (junction 14) is placed in an Rf environment which contains two high power fundamental signal sources, 10, 12. A bandpass filter unit 20 is then tuned to a particular intermodulation frequency of the two fundamental signals which can be calculated by the following equation:

$$f_{IMP} = mf_1 \pm nf_2$$

where
$f_{IMP}$ = intermodulation frequency
$f_1, f_2$ = two fundamental frequencies
m,n = harmonic numbers of the applied signals, the sum of which defines the order of the intermodulation product.

The acoustic source 16 varies the mechanical pressure which is applied to the junction, thereby, modulating the amplitude of the intermodulation products which are generated in the junction nonlinearity. The amplitude modulation is recovered in the envelope detector unit 22 and is used to produce an output voltage that is proportional to the level of the AM sidebands. Since, the envelope detector will respond only to the amplitude modulated signal at the tuned frequency, $f_{IMP}$, the presence of an output indicates that the junction experiencing acoustic pressure variations is a source of the intermodulation signal.

Figure 2:
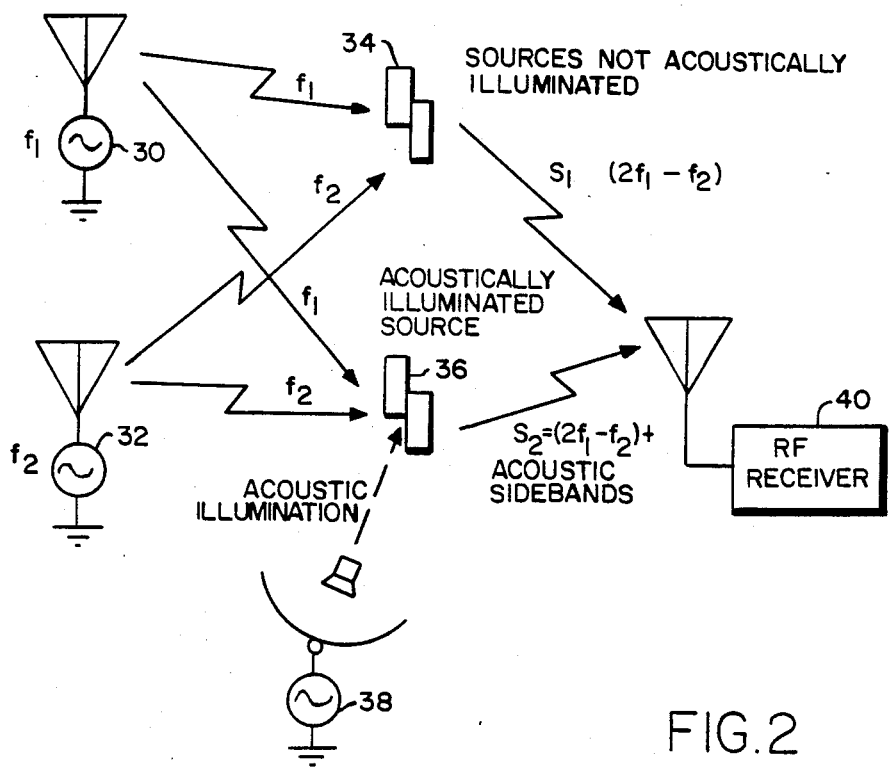
FIG. 2 is a schematic diagram of the selective acoustic tagging of one non-linear intermodulation source in a multiple source environment.

Turning now to FIG. 2, there is shown a schematic diagram wherein one nonlinear source in a multiple source environment is acoustically illuminated to establish it as the source of intermodulation interference. A pair of RF sources 30, 32 which are respectively operating at frequencies $f_1$, $f_2$ apply their signals to junctions 34, 36. An acoustic wave generating source 38 is utilized to illuminate or acoustically vibrate a selected junction 36. The resulting amplitude modulated signal is received at RF receiver 40.

Thus, it may clearly be seen by FIG. 2 that the use of acoustic illumination selectively to tag a nonlinear junctions, can identify one offending source in the presence of many. By using a highly directional acoustic source to selectively illuminate specific joints, pressure modulation will be produced only on those joints illuminated. Since the wavelength of acoustic waves is very short relative to electromagnetic waves, a high degree of directivity can be obtained by the acoustic illuminator using a relatively small acoustic antenna or radiator. A nondirectional acoustic radiator which is located in the focal point of a parabolic reflector will allow the acoustic energy to be focused into a narrow beam in the same way that reflector antennas focus electromagnetic waves. In this manner, the location apparatus does not depend upon the angle-of-arrival of the interference signal at the receiving antenna. Thus, a relatively low gain/broad beamwidth RF antenna may be used to detect the radiated intermodulation signals. By selectively vibrating the various junctions in the environment one at a time, a junction that is indeed a source of interference will produce a signal at the output of the AM detector in the receiver.

Figure 3:
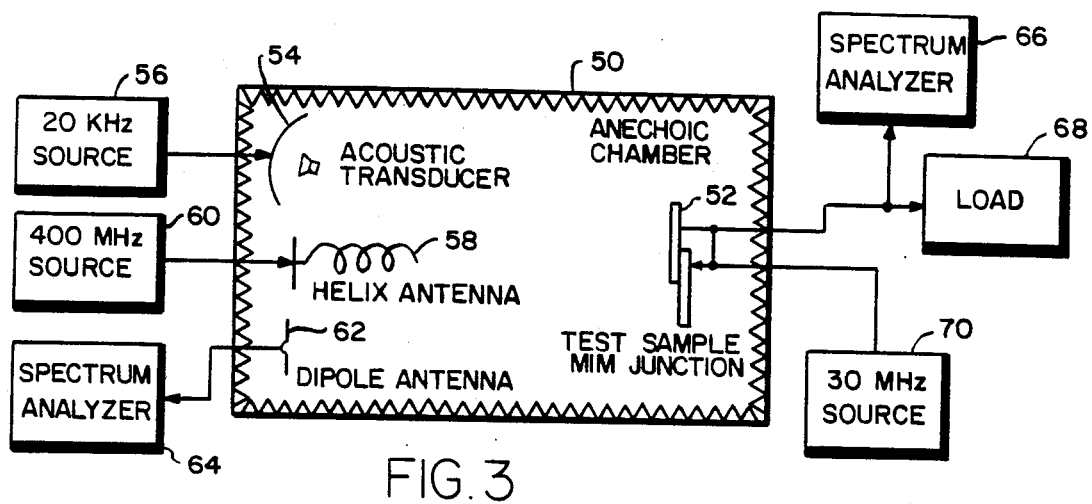
FIG. 3 is a block diagram of the test measurement setup for the intermodulation interference locator apparatus.

There is shown in FIG. 3, a validation test measurement configuration for experimentally measuring the acoustic tagging of test sample metal-insulator-metal junctions. The test measurements were accomplished in an anechoic chamber 50 in order to avoid erroneous results due to stray RF signals or noise. The test sample metal-insulator-metal junction 52 is positioned at one end of the anechoic chamber 50. At the other end of the anechoic chamber 50 are positioned the antenna elements which provide the test signals and receive the amplitude modulated interference signal. An acoustic transducer 54 which is energized by the 20 KHz source 56 is utilized to apply the acoustic signal to the metal-insulator-metal test sample junction. A dipole antenna 62 which is connected to a spectrum analyzer unit 66 is utilized to measure the amplitude modulated signal that is generated by the metal-to-metal test sample junction 52. The test sample junction 52 is directly connected to an RF signal source 70 which applies a 30 MHz signal to the test sample junction. The amplitude modulated signal that is generated within the test sample junction 52 is measured by the spectrum analyzer unit 66. A load unit 68 is provided as a termination for the transmission line between the test sample 52 and the spectrum analyzer unit 66.

In order to verify the validity of the location technique as described above, a series of experimental verification measurements were performed. The verification measurements were performed using several types of metal-insulator-metal junction test samples. The following three goals to verify the concept of the location technique were accomplished: (1) an intermodulation signal was generated in a sample metal-insulator-metal junction; (2) an acoustic wave was generated with a power density of sufficient magnitude to mechanically vibrate the test sample metal-insulator-metal junction; and (3) the intermodulation signal generated in the metal-insulator-metal junction was detected along with the associated AM sidebands.

In order to minimize the residual (inherent) intermodulation product level of the test setup, the two fundamental signals were isolated from each other by radiatively coupling one of the signals to the test sample metal-insulator-metal junction while conductively coupling the second one. The verification measurements were performed using one fundamental signal in the HF frequency band (30 MHz) as the conducted signal and a UHF signal (400 MHz) as the radiated signal. While an acoustic transducer is shown in the test configuration of FIG. 3, it should be well understood that any of the many suitable commercially available acoustic radiators may be used to illuminate the test sample metal-insulator-metal junctions, including a magnetic audio tweeter placed in the focal point of a parablic reflector. The acoustic (or modulation) frequency used in the tests was varied between 10 and 50 kHz. As may be seen in FIG. 3, the intermodulation signal which is generated in the test sample metal-insulator-metal junction is monitored by using both radiated and the conducted measurement techniques. A spectrum analyzer was used by both methods as the RF receiver which produced a visual indication of the presence of AM sidebands.

Figure 4:
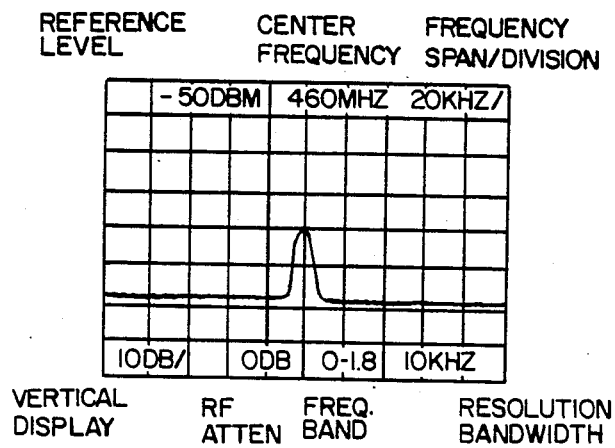
FIGS. 4, 5, 6 and 7 are graphical representations of test measurement results on the present invention.
Figure 5:
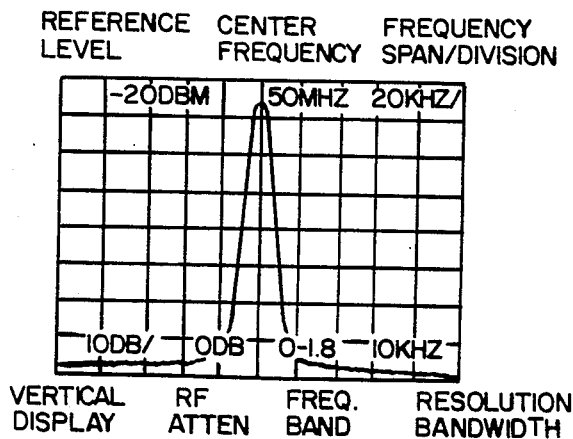

The results of the measurement tests clearly illustrate the viability and accuracy of the acoustic tagging technique. For example, there is shown in FIGS. 4, 5, 6 and 7 the test measurement waveforms using the test configuration of FIG. 3 and the results as shown on the spectrum analyzer display for a series of measurements. In order to quantify the inherent intermodulation level of the test setup the test sample metal-insulator-metal junction was replaced with a solid sheet of aluminum. With the fundamental output power levels set at 200 W for the 400 MHz radiated signal and 400 mW for the 30 MHz conducted signal, the third order intermodulation product ($f_1 + 2f_2$) at 460 MHz was measured to be $-90$ dBm, as seen in FIG. 4. The measured inherent third-order intermodulation level was measured using the conducted receiving path. A test sample metal-insulator-metal junction was then constructed of two overlapping aluminum panels held in a test jig built as a parallel plate transmission line using the test sample as one of the conductors. The equivalent power levels for the fundamental signals that were used in testing the solid sheet of aluminum were used again. The intermodulated level which was generated in the test sample metal-insulator-metal junction was measured to be $-25$ dBm, as is shown in FIG. 5. A piezo-electric transducer that was incorporated in an audio horn was utilized to illuminate the test samples with an acoustic wave with a power density at the test sample of approximately 130 dB/$\mu$Pa.

Figure 6:
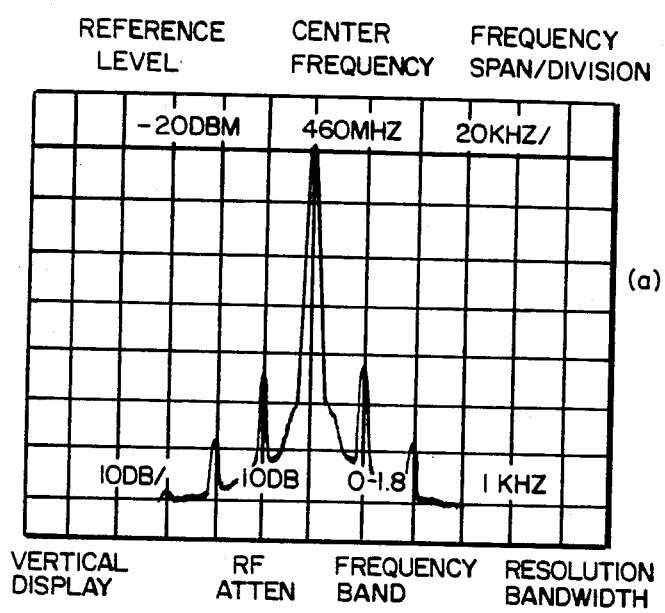
Figure 7:
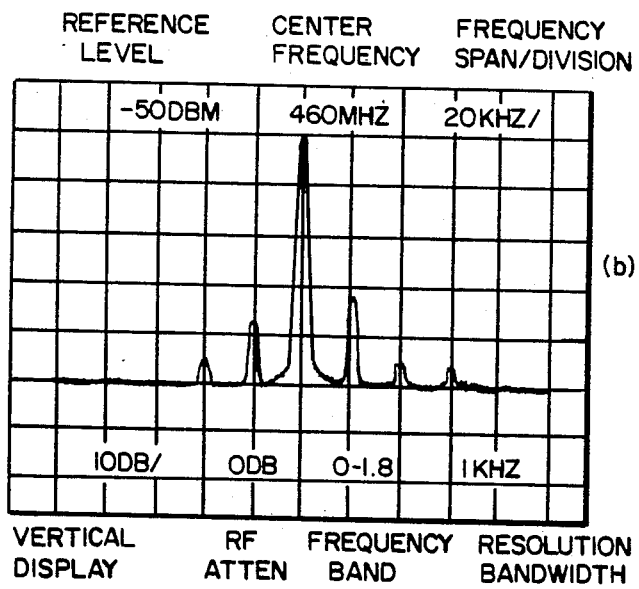

The resulting spectrum analyzer display is shown in FIG. 6 for the conducted receiving path, and in FIG. 7 for the radiated receiving path. It may be noted, that both FIGS. 6 and 7 show the presence of AM sidebands at $f_{IMP} \pm qf_a$ (where $f_{IMP}=460$ MHz, $f_a=20$ kHz, and $q=1,2,3$). The primary sideband ($q=1$) is 30 to 40 dB below the carrier (IM) signal indicating a modulation index of 0.1 to 0.01 percent.

A series of similar tests were performed on several types of metal-insulator-metal junction test samples that were chosen so as to vary the metal type, metal thickness, metal surface state (oxide layer), and construction (overlapping, bolted, riveted, etc.) and with various acoustic transducers. These tests indicate that although the AM sideband levels are proportional to the level of the intermodulation that is generated in a metal-insulator-metal junction, the relative level of the sidebands are a function of the construction and type of material that is used in the metal-insulator-metal junction. This conclusion can be intuitively understood by noting that the modulus of rigidity (or resistance to vibration) will be much higher for a tightly riveted metal-to-metal interface than for two loosely overlapped panels. However, the relative AM sideband levels are also a function of the acoustic power density illuminating the metal-insulator-metal junction. Thus, the effect of the modulus of rigidity on the relative AM sideband levels can be offset by increasing the acoustic power density.

The results of these tests also indicate that the third order intermodulation product levels for a given metal-insulator-metal junction are nominally 20 dB higher than the second order intermodulation product level. However, second order products appear to be more sensitive to mechanical vibration, and thus, allow the easier generation of AM sidebands on second order intermodulation products. For example, tests which were performed on three riveted test sample metal-insulator-metal junctions showed that the relative sideband levels varied between $-55$ to $-35$ dB for third order intermodulation products and between $-28$ to $-12$ dB for second order intermodulation products. Thus, for use in the location technique, the second order acoustic sidebands are likely to be more easily detected.

The technique for locating passive nonlinear interference sources was achieved by utilizing a high power, narrow beam of acoustic energy to induce a modulation tag on the intermodulation product that is generated by the interference source. The acoustic energy is used to mechanically vibrate the metal-insulator-metal junction, in order to cause the level of the intermodulation products that are generated in the junction to become amplitude modulated at the frequency of the acoustic illumination. The detection of the AM sidebands with a low noise RF receiver which is tuned to a particular intermodulation signal clearly indicates that the junction is a source of nonlinear interference.

It will be noted that the verification measurements indicate that the acoustic tagging technique is viable. This conclusion is established by the fact that amplitude modulation was successfully induced on the intermodulation products which were generated in several representative metal-insulator-metal junction test samples. Test results also indicate that second order intermodulation product levels are generally lower in magnitude than third order intermodulation products. However, second order products are generally more susceptible to the effects of pressure variations thereby causing the AM modulation index to be larger.

Although the invention has been described with reference to a particular embodiment, it will be understood to those skilled in the art that the invention is capable of a variety of alternative embodiments within the spirit and scope of the appended claims.

What is claimed is:

1. An intermodulation interference locator apparatus comprising in combination:
    a first RF signal means operating at a first RF frequency,
    a second RF signal means operating at a second RF frequency,
    a means for vibrating;
    a first and second member joined together to form a metal junction, said junction being exposed to said first and second RF frequencies, said vibrating means operatively connected to said junction to produce mechanical vibrations in said junction said junction responding to said first and second RF frequencies and said mechanical vibrations by generating an intermodulation inteference signal, and,
    an RF receiver means tuned to the intermodulation frequency of said first and second RF frequency, said RF receiver means receiving and detecting said intermodulation inteference signal generated by said junction, said RF receiver means providing an output signal in response to said intermodulation interference signal.

2. An intermodulation interference locator apparatus as described in claim 1 wherein said vibrating means comprises a means for generating an acoustic signal, said acoustic signal generating means to generate an acoustic wave, said acoustic wave being applied to said junction to mechanically vibrate said junction at a constant frequency, said junction responding to said acoustic wave by generating an amplitude modulated intermodulation signal which has the frequency of said mechanical vibration, said RF receiver means detecting said amplitude modulated intermodulation signal and providing an audio signal which is representative thereof.

3. An intermodulation interference locator apparatus as described in claim 2 wherein said RF receiver means includes a bandpass filter and an envelope detector means to detect said amplitude modulated intermodulation signal.

4. An intermodulation interference locator apparatus as described in claim 2 wherein said junction is one of a plurality of junctions, all of which are exposed to said first and second RF frequencies in order to identify a particular junction as the source of intermodulation interference, each junction of said plurality of junctions is separately illuminated by said acoustic wave to identify the junction that is the source of the intermodulation interference.

5. An intermodulation interference locator apparatus as described in claim 4 wherein, said plurality of junctions are formed with a metallic material to form metal-to-metal junctions.

6. An intermodulation interference locator apparatus as described in claim 1 wherein each member of said first and second member comprises a metallic material to form a metal-to-metal junction.

* * * * *